United States Patent [19]

Baumann

[11] 4,335,176

[45] Jun. 15, 1982

[54] BONDED NEEDLED FIBER GLASS THERMOPLASTIC REINFORCED MATS

[75] Inventor: John A. Baumann, Lower Burrell, Pa.

[73] Assignee: PPG Industries, Inc., Pittsburgh, Pa.

[21] Appl. No.: 209,442

[22] Filed: Nov. 24, 1980

[51] Int. Cl.³ .................. D04H 3/10; D04H 3/12
[52] U.S. Cl. .................................... 428/228; 428/235; 428/300
[58] Field of Search ............ 428/235, 234, 228, 227, 428/300, 298, 299, 301, 302, 86; 156/62.8, 148; 264/258

[56] References Cited

U.S. PATENT DOCUMENTS 3,819,465  6/1974  Parsons et al. ............... 428/234
4,277,531  7/1981  Picone ............................. 428/300

*Primary Examiner*—Michael W. Ball
*Attorney, Agent, or Firm*—John E. Curley

[57] ABSTRACT

A stampable thermoplastic fiber glass reinforced product is shown which contains immediately below the resin surface on both major surfaces spikes of glass fibers integral with a mat. Utilization of the spikes with reference to the laminate surface produces laminates having improved stamping characteristics.

12 Claims, 4 Drawing Figures

BONDED NEEDLED FIBER GLASS THERMOPLASTIC REINFORCED MATS

FIELD OF THE INVENTION

The invention relates to thermoplastic resin-fiber glass reinforced composites. Composites of this type have enjoyed success in the preparation of stamped parts for various uses such as automotive seat shells, motor housings, musical instrument cases and the like. In the preparation of stamped parts from thermoplastic resin-fiber glass reinforced composites, the composite material is normally heated to render the resin flowable and the heated composite is placed in a press and cold die molded. The process for shaping these composites is described in U.S. Pat. Nos. 3,621,092 and 3,626,053.

Composites of resin and glass fibers are used which possess as the glass fiber reinforcement, mats of continuous glass fibers which have been needled. Typically, these mats are prepared by puncturing a continuous glass fiber strand mat with a plurality of barbed needles to entangle the strands and break some of them into short lengths. This needling operation usually results in the formation of mats having one major surface which has a high density of spikes sticking upwardly from its surface while the opposed major surface has a substantially reduced number of spikes thereon.

In the past when these mats have been employed in the production of thermoplastic laminates, the laminates have been formed by plying the reinforcing mats in the laminates with the high density spiked surfaces facing in the same direction. The laminates made by this system have performed satisfactorily with strand mats that have utilized strands having 50 filaments or less. It has been found, however, that when strands using more than 50 filaments are used to make needled mats from continuous strand mats that often, depending upon the desired stamped part, unsatisfactory performance is encountered. Specifically, it is found that laminates prepared from such mats in the conventional manner swell excessively during heating and the heated blanks of composite frequently fail to fill the dies during stamping at a normally adequate pressure.

THE PRESENT INVENTION

In accordance with the instant invention fiber glass reinforced laminates prepared from needled continuous strand mats made from strands having fifty filaments or more per strand are provided which overcome the problems of excessive laminate loft and provide composites that can be stamped in a press with little or no difficulty.

The laminates of the instant invention are typified by having at least two fiber glass mats therein, each of the mats having a major surface which contains a high density of spikes of fiber glass extending outwardly therefrom. The mats are placed so that the major surface of each mat containing the high density of spikes of fiber glass are opposed to each other and when they are impregnated with thermoplastic resin, provide a laminate which has the spiked surfaces of the reinforcing mats positioned immediately below the two major surfaces of the laminate.

BRIEF DESCRIPTION OF THE DRAWINGS

While the novel features of the laminates of the instant invention are set forth with particularity in the accompanying claims, a full and complete understanding of the invention may be had by referring to the detailed description contained hereinafter and from the accompanying drawings in which:

DETAILED DESCRIPTION OF THE INVENTION

Figure 1:
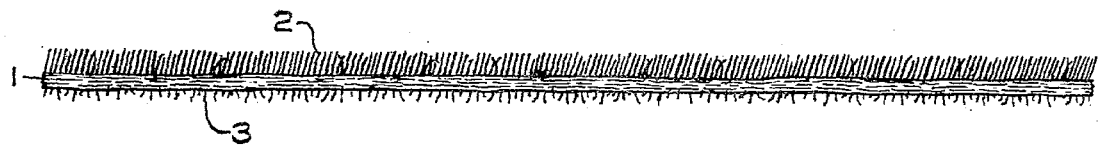
FIG. 1 is a diagrammatic illustration of a needled continuous strand mat used in laminate reinforcement.

The needled continuous glass strand mats utilized in the preparation of the laminates of the instant invention are provided by needling continuous strand mats which have been formed from continuous strands having fifty or more glass filaments per strand. Typically, the strands used to prepare the continuous strand mat for needling contains 75 to 125 filaments, preferably 100. Mats containing continuous strands having larger numbers of filaments i.e. 125 to 250 or more are within the contemplation of the instant invention. The strands used to make the continuous strand mat typically contains size ingredients on them which are compatible with the thermoplastic resin in which the mat is to be used. Typical sizes used for strands that are formed into mat for use in polypropylene laminates for example are described in U.S. Pat. No. 3,849,148. Where resins other then polypropylene are used, the size may have a different chemical composition to render the strands compatable with the resin system.

In the manufacture of the glass strands used to make mat recourse to strands having filaments of various diameters may be had. Typical filaments used in the preparation of strands are those ranging in diameter from G to T.

Typical thermoplastic resins suited for this use are homopolymers and copolymers of resins such as: (1) vinyl resins formed by the polymerization of the vinyl halides or by the copolymerization of vinyl halides with unsaturated polymerizable compounds, e.g., vinyl esters; alpha, beta-unsaturated acids; alpha, beta-unsaturated esters; alpha, beta-unsaturated ketones; alpha, beta-unsaturated aldehydes and unsaturated hydrocarbons such as butadienes and styrenes; (2) poly-alpha-olefins such as polyethylene, polypropylene, polybutylene, polyisoprene and the like including copolymers of poly-alpha-olefins; (3) phenoxy resins; (4) polyamides such as polyhexamethylene adipamide; (5) polysulfones; (6) polycarbonates; (7) polyacetyls; (8) polyethylene oxide; (9) polystyrene, including copolymers of styrene with monomeric compounds such as acrylonitrile and butadiene; (10) acrylic resins as exemplified by the polymers of methyl acrylate, acrylamide, metholoacrylamide, acrylonitrile and copolymers of these with styrene, vinyl pyridines, etc.; (11) neoprene; (12) polyphenylene oxide resins; (13) polymers such as polybutylene terephthalate and polyethyleneterephthalate; and (14) cellulose esters including the nitrate, acetate, propriontate, etc. This list is not meant to be limiting or exhaustive but merely illustrates the wide range of polymeric materials which may be employed in the present invention.

It is also contemplated that fillers may be employed in the thermoplastic resins where desired. These fillers can be any of a variety of conventional resin fillers known in the art, talc, calcium carbonate, clays, diatomaceous earths being a few of those typically used.

Continuous glass strand needled mat used in the laminates of the instant invention are prepared by passing a continuous, unbonded, glass strand mat through a conventional felting loom or needler which is equipped with barbed needles. During passage through the needler the mat is punctured by a series of rows of such needles to both entangle the glass strands and to break strands to thereby provide a mechanically bonded mat having short strands and filaments therein. The needling also provides, when all needle barbs are positioned on the needles in the same direction, a cohesive mat structure having one major surface with a dense accumulation of fibers protruding from the surface and a second major surface containing fibers protruding from the surface but having substantially less fibers than the dense major surface.

Protruding fibers on the major surfaces of the mats shall hereinafter be referred to as "spikes".

One process for preparing needled mats from continuous strands either from forming package feeds or directly from a glass fiber making bushing is described in assignee's U.S. Pat. No. 4,158,557. The needler or felting loom may be any of a plurality of commercially available units sufficient in size to accomodate the width of the continuous glass strand mat to be needled. Applicant, in preparing mats for the laminates of the instant invention, has successfully used a Model 44- Fiber Locker-manufactured by the J. Hunter Machine Co., North Adams, Mass.

Typically the needles employed are triangular shaped, steel needles with nine barbs arranged to catch strands as the needles enter the mat and to release the caught materials as they are withdrawn from the mat. Diameters of the needles typically range between 0.6 and 1.2 millimeters and the mats are punctured to provide a puncture density of between 100 to 400 penetrations per square inch of surface or more.

Continuous glass strand mats which are needled in the manner described herein typically emerge from the needler in a cohesive state and have sufficient mechanical integrity that they can be handled without distorting their generally flat shape. Characteristically they contain two major surface, two side edges and a leading edge. The trailing edge of the mat is provided when the mat is cut after reaching a desired length. In a typical manufacturing process, continuous strand mat is formed continuously and fed through the needling machine continuously. It is folded in boxes for use in laminating or rolled into large rolls for the same purpose at convenient lengths.

The continuous glass strand mats after needling have an appearance generally of the type shown in FIG. 1. Typically, as shown in FIG. 1, the mat 1 has a dense surface of spikes 2 on one of its major surfaces. The second major surface has spikes present but in substantially reduced numbers. The number of spikes 3 on the less dense surface tends to be about 25 to about 50 percent less than those appearing on the dense surface. As used herein, therefore, the term "spiked surface" shall mean the dense major surface of the mat and the term "non-spiked" surface shall mean the less densely spiked major surface of the mat.

Figure 2:
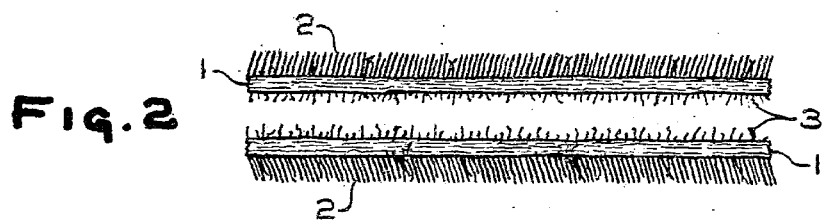
FIG. 2 is a diagrammatic illustration of a ply arrangement for two reinforcing mats used in laminate reinforcement as practiced in accordance with the invention.
Figure 3:
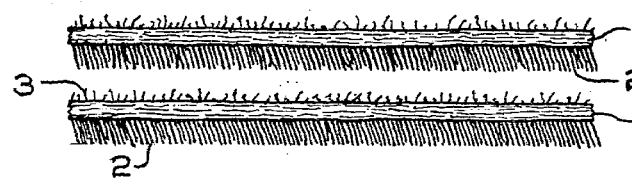
FIG. 3 is a diagrammatic illustration of a ply arrangement for two reinforcing mats used in laminate reinforcement as practiced by the prior art.

FIG. 2 shows the arrangement of two mats of the type shown in FIG. 1 as they are placed when used to reinforce a thermoplastic resin laminate. As shown further in FIG. 4, the mats 1 are fed to a laminating zone between two belts 10 and 9 which travel over the rollers 12 and 11 respectively. Two resin overlays 4 and 5 are passed with the two mats 1 between the belts 10 and 9. The mats 1 have a resin extrudate 7 placed between them before they are compressed by the belts 10 and 9. This extrudate 7 is typically in the form of a layer of resin across the width of mats 1 and is constantly delivered to the system from extruder 6 and its associated die 8.

Figure 4:
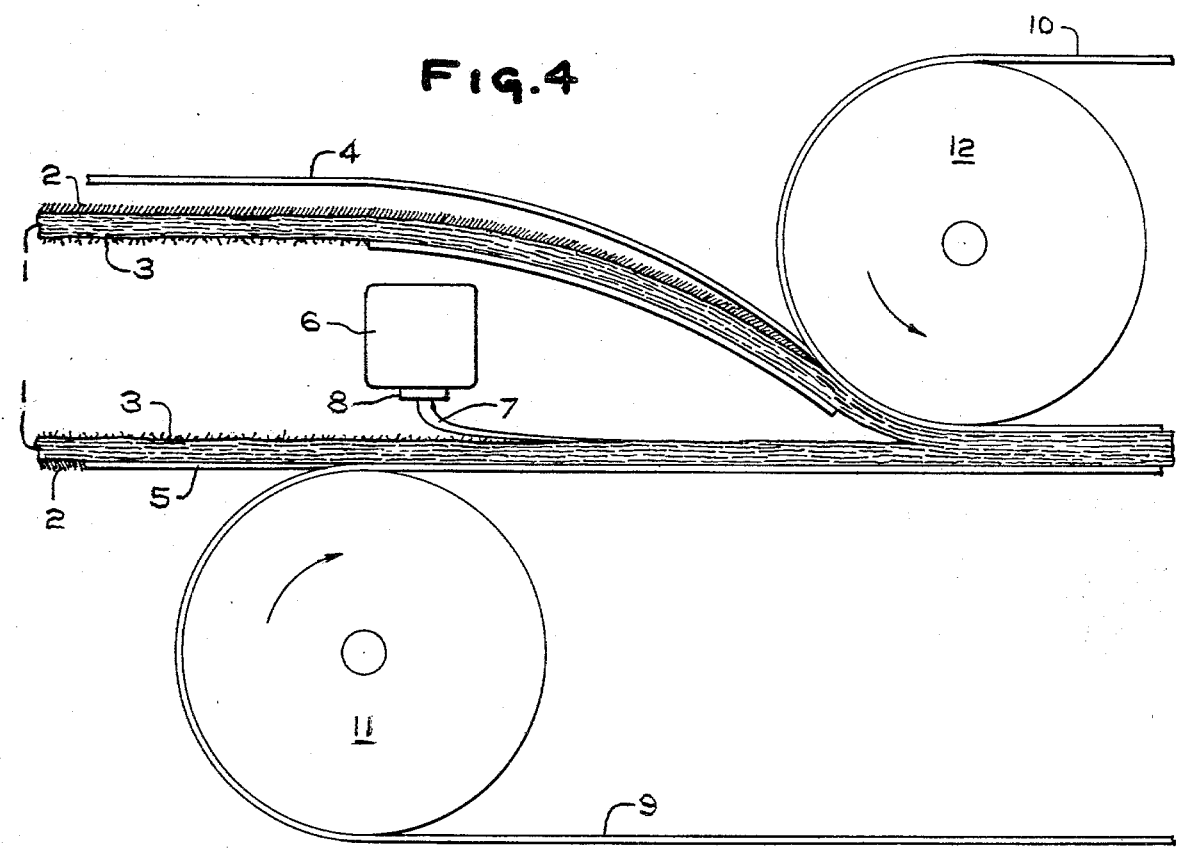
FIG. 4 is a diagrammatic illustration of a manufacturing process for using the ply arrangement of FIG. 2 to produce laminates of the invention.

As can be seen clearly in FIG. 4, the dense or spiked major surface of each of the mats 1 are opposed to each other and each faces the overlay sheet 4 or 5 lying between the mats 1 and the respective belts 10 and 9. The non-spiked surfaces of the mats 1 face each other and are positioned with the extrudate 7 in between them as they pass into the laminating machine (not shown) through which belts 10 and 9 pass with the resin and mats.

The overlays 4 and 5, mats 1 and extrudate 7 are laminated typically by applying pressure to them through belts 10 and 9. The temperatures in the laminating zone are maintained sufficiently high to insure that the overlay sheets 4 and 5 become molten. Residence times are not critical but should be long enough to insure that the resins thoroughly impregnate the mats 1. The thoroughly impregnated resin-glass composite is then cooled, usually while maintaining pressure on the composite until the resin solidifies. The resulting product is a sheet of resin having below both of its major surfaces a mat of needled continuous glass strands having a spiked surface.

The laminate or composite is shown prepared with overlay sheets 4 and 5 in the preferred embodiment of FIG. 4 but laminates or composites of thermoplastics may also be prepared by using the extrudate 7 alone. It is also possible to use an extruder with multiple dies and provide three layers of extrudate, one on each side of the mats 1 and the third in the center of the mats 1.

While the invention has been described with reference to certain preferred embodiments, it is not intended to be limited thereby except insofar as appears in the accompanying claims.

I claim:

1. A stampable laminate product comprising two mats of glass fibers, said mats being constructed from continuous strands which have been needled and which have a spike surface and a non-spike surface, said mats being oriented in the laminate so that the spike surface of each mat faces the surface of the laminate and wherein the needled mats are impregnated with molten thermoplastic resin which is subsequently coated to provide a laminate having thermoplastic resin surfaces.

2. The product of claim 1 wherein the thermoplastic resin is a member of the group consisting of nylon, polypropylene, polybutyleneterephthalate, polyethyleneterephthalate and polyethylene.

3. The laminate product of claim 1 wherein the thermoplastic resin is nylon.

4. The product of claim 1 wherein the thermoplastic resin is polypropylene.

5. The product of claim 1 wherein the thermoplastic resin is polybutyleneterephthalate.

6. The product of claim 1 wherein the thermoplastic resin is polyethyleneterephthalate.

7. A stampable fiber glass reinforced thermoplastic resin laminate having two major surfaces and containing at least two fiber glass mats therein, each of said mats having a spiked major surface and a non-spiked major surface, said mats being oriented in the laminate with their non-spiked surfaces facing each other and each of the spiked mats being impregnated throughout with molten thermoplastic resin and subsequently cooled so that the spiked surfaces of each of the mats is positioned immediately below each of the major surfaces of the resulting thermoplastic resin laminate.

8. The thermoplastic resin sheet of claim 7, wherein the thermoplastic resin is a member of the group consisting of nylon, polypropylene, polybutyleneterephthalate, polyethyleneterephthalate and polyethylene.

9. The thermoplastic resin sheet of claim 7 wherein the thermoplastic resin is nylon thermoplastic resin sheet.

10. The product of claim 7 wherein the thermoplastic resin is polypropylene.

11. The product of claim 7 wherein the thermoplastic resin is polybutyleneterephthalate.

12. The product of claim 7 wherein the thermoplastic resin is polyethyleneterephthalate.

* * * * *

UNITED STATES PATENT AND TRADEMARK OFFICE
CERTIFICATE OF CORRECTION

PATENT NO.  :  4,335,176
DATED       :  June 15, 1982
INVENTOR(S) :  John A. Baumann It is certified that error appears in the above-identified patent and that said Letters Patent is hereby corrected as shown below:

Column 4, line 57, "coated" should read --cooled--.

Signed and Sealed this

Fifth Day of June 1984

[SEAL]

Attest:

GERALD J. MOSSINGHOFF

Attesting Officer           Commissioner of Patents and Trademarks